United States Patent [19]

Wood et al.

[11] Patent Number: 5,306,429

[45] Date of Patent: Apr. 26, 1994

[54] COPOLYMERS OF POLYAMINO ACIDS AS SCALE INHIBITION AGENTS

[75] Inventors: Louis L. Wood, Rockville; Gary J. Calton, Elkridge, both of Md.

[73] Assignee: Srchem, Incorporated, Elkridge, Md.

[21] Appl. No.: 968,319

[22] Filed: Oct. 29, 1992

[51] Int. Cl.$^5$ ................................................. C02F 5/12
[52] U.S. Cl. ...................................... 210/698; 252/180
[58] Field of Search ............................. 210/698–701; 252/180, 181

[56] References Cited

U.S. PATENT DOCUMENTS

| | | | |
|---|---|---|---|
| 3,846,380 | 11/1974 | Fujimoto et al. | 260/78 A |
| 4,534,881 | 8/1985 | Sikes et al. | 210/698 |
| 4,640,793 | 2/1987 | Persinski et al. | 210/700 |
| 5,116,513 | 5/1992 | Koskan et al. | 210/698 |
| 5,152,902 | 10/1992 | Koskan et al. | 210/698 |

*Primary Examiner*—Peter A. Hruskoci
*Attorney, Agent, or Firm*—William S. Ramsey

[57] ABSTRACT

Copolymers of polyamino acids formed by reaction of polysuccinimide with alkyl, alkenyl, aromatic amines or alkyl and alkenyl polyamines are useful as inhibitors of mineral scale deposition. Such compounds may be used in high volume water applications such as boiler, cooling, oil well, agricultural sprays and irrigation water. They are also useful in preventing scale formation on fabrics when formulated with laundry detergents and in preventing scale formation on glassware when formulated in dishwashing detergents.

6 Claims, No Drawings

COPOLYMERS OF POLYAMINO ACIDS AS SCALE INHIBITION AGENTS

FIELD OF THE INVENTION

This invention relates to the use of copolymers of polyamino acids and their salts as scale inhibition agents.

DESCRIPTION OF RELATED ART

U.S. Pat. No. 3,846,380 discloses the preparation and composition of copolymers of polyamino acids with primary or secondary aliphatic amines, followed by alkaline hydrolysis to provide surface active agents. Emphasis is placed on long chain alkylamines having eight to twenty carbon atoms. The products formed are said to have good solubilizing ability, emulsifying and dispersing properties, as well as good foaming properties. They are useful as foaming agents, solubilizing agents, dispersing agents, emulsifying agents, rustproofing agents, fiber-treating agents, level dyeing agents and retarding agents.

U.S. patent application Ser. No. 07/926,242, filed Aug. 7, 1992, by Louis L. Wood, incorporated herein by reference, discloses methods of preparation of copolymers of amino acids wherein polyamines are reacted to form a polymer network. These materials are excellent inhibitors of metal scale deposition.

SUMMARY OF THE INVENTION

We have discovered that polypeptide materials that have a general formula of

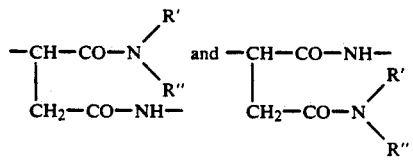

wherein R' is a hydrogen or an alkyl or alkenyl group having 1 to 20 carbons and R" is an alkyl or alkenyl group having 2 to 20 carbons, together with at least one of the groups

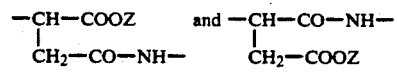

wherein Z represents a hydrogen atom, an alkali metal or an alkaline earth metal or ammonium ion, as a repeating unit have useful properties of inhibition of mineral scale deposition.

One object of this invention is to provide methods useful in inhibition of metal scale formation in hard water, boiler water, cooling water, oil well waters, agricultural sprays and irrigation water.

Another object is to provide a method of preventing deposition of metal salts in clothing.

Another object is to prevent deposition of scale on glassware washed in an automatic dishwasher.

A final object is to provide methods for preventing scale formation which are effective, low in cost, and environmentally benign.

DEFINITIONS

Polysuccinimide is the imide form of polyaspartic acid and is also known as anhydropolyaspartic acid.

The counterion, "Z" above includes, but is not limited to, the alkali and alkaline earth metals examples of which as their cations are, $Na^+$, $K^+$, $Mg^+$, $Li^+$, and $Ca^{++}$, $Zn^{++}$, $Ba^{++}$, $Co^{++}$, $Fe^{++}$, $Fe^{+++}$, and $NH_4^+$.

DETAILED DESCRIPTION OF THE EMBODIMENTS

Methods of preparation of polyamino acid derivatives based upon reaction of primary or secondary amines with polysuccinimide are known as disclosed in U.S. Pat. No. 3,846,380, incorporated herein by reference. These materials were observed to have useful properties as surface active agents having no cloud point and good solubilizing, emulsifying and dispersing abilities. Thus, their use as foaming agents, solubilizing agents, dispersing agents, emulsifying agents, rustproofing agents, fiber treating agents, level dyeing agents and retarding agents were disclosed.

The use of these agents as inhibitors of scale deposition has hitherto been unknown. We have found that these compounds are excellent inhibitors of the formation of metal scale deposits. In particular, the types of scale in which deposition is inhibited are those exemplified by hard water, boiler water, cooling water, oil well waters, agricultural sprays and irrigation water. Further, this property makes them useful as builders in detergents, where deposition of metal salts are injurious to clothing and impart a hard crust to the textile fibers. Their use to prevent deposition of scale on glassware makes them desirable in detergents for automatic dishwashers and the like. As is pointed out in the examples, we have found that these compounds are excellent inhibitors of the formation of scale deposits.

The effective compounds are polyamides having in their molecules at least one of the groups

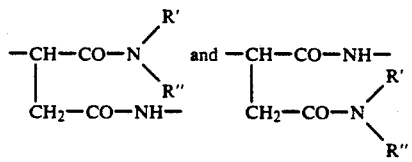

wherein R' is a hydrogen or an alkyl or alkenyl group having 1 to 20 carbons and R" is an alkyl or alkenyl group having 2 to 20 carbons, together with at least one of the groups

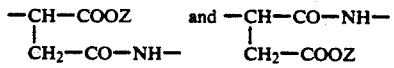

wherein Z represents a hydrogen atom, an alkali metal or an alkaline earth metal or ammonium ion, as a repeating unit.

Preferred groups for R' and R" are hydrogen, methyl, oleyl, stearyl and lauryl.

EXAMPLE 1

Precipitation assay for calcium sulfate

The material to be tested as an inhibitor of scale formation was added in appropriate quantities to a solution of 5 ml of calcium chloride solutions (21.6 g/L of $CaCl_2$ dihydrate and 41.4 g/L of NaCl) and 5 ml of sulfate solution (20.9 g/L of $Na_2SO_4$ and 41.4 g NaCl). The mixture was then placed in an oven at 160° F. for 3 hours. Finally the mixture was filtered through Whatman #2 paper and dried at 160° F. for 8 hours, after which the weight of precipitate was determined.

| compound | additive (ppm) | weight of precipitate (mg) |
| --- | --- | --- |
| blank | | 44 |
| polyacrylate, 5000 molecular weight | | 46 |
| 5% stearyl α,β-polyaspartate amide/ α,β-polyaspartic acid | 5 | 34 |
| 10% stearyl αβ-polyaspartate amide/ α,β-polyaspartic acid | 5 | 31 |

It will be apparent to those skilled in the art that the examples and embodiments described herein are by way of illustration and not of limitation and that other examples may be utilized without departing from the spirit and scope of the present invention, as set forth in the appended claims.

We claim:

1. A method of preventing mineral scale deposition including calcium phosphate or calcium sulfate in water comprising the addition of an amount effective in preventing said deposition to said water of a polyamide having in its molecule at least one of the groups

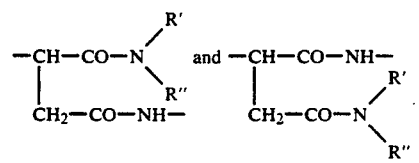

wherein R' is a hydrogen or an alkyl or alkenyl group having 1 to 20 carbons or a polyamine and R" is an alkyl or alkenyl group having 2 to 20 carbons or a polyamine, together with at least one of the groups

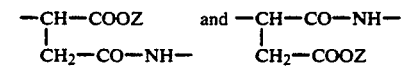

wherein Z represents a hydrogen atom, an alkali metal or an alkaline earth metal or a ammonia, as a repeating unit.

2. A method for preventing scale formation of claim 1 wherein the polyamide is a copolymer of stearyl α,β-polyaspartate amide and α,β-polyaspartic acid or its salt.

3. A method for preventing scale formation of claim 1 wherein the polyamide is a copolymer of oleyl α,β-polyaspartate amide and α,β-polyaspartic acid or its salt.

4. A method for preventing scale formation of claim 1 wherein the polyamide is a copolymer of N-methyl-N-lauryl α,β-polyaspartate amide and α,β-polyaspartic acid or its salt.

5. A method for preventing scale formation of claim 1 wherein the polyamide is a copolymer of lauryl α,β-polyaspartate amide and α,β-polyaspartic acid or its salt.

6. A method for preventing scale formation of claim 1 wherein the polyamide is a copolymer of lauryl α,β-polyaspartate amide, palmityl α,β-polyaspartate amide and α,β-polyaspartic acid or its salt.

* * * * *